(12) United States Patent
Wifong et al.

(10) Patent No.: US 10,065,174 B1
(45) Date of Patent: Sep. 4, 2018

(54) PELLETIZED IMMOBILIZED AMINE SORBENT FOR $CO_2$ CAPTURE

(71) Applicant: The United States Department of Energy, Washington, DC (US)

(72) Inventors: Walter C. Wifong, Jefferson Hills, PA (US); McMahan L. Gray, Pittsburgh, PA (US); Yee Soong, Monroeville, PA (US); Brian W. Kail, Pittsburgh, PA (US)

(73) Assignee: U.S. Department of Energy, Washington, DC (US)

( * ) Notice: Subject to any disclaimer, the term of this patent is extended or adjusted under 35 U.S.C. 154(b) by 82 days.

(21) Appl. No.: 15/156,773

(22) Filed: May 17, 2016

Related U.S. Application Data

(60) Provisional application No. 62/233,493, filed on Sep. 28, 2015.

(51) Int. Cl.
*B01J 20/32* (2006.01)
*B01J 20/26* (2006.01)
*B01J 20/28* (2006.01)

(52) U.S. Cl.
CPC ....... *B01J 20/267* (2013.01); *B01J 20/28011* (2013.01); *B01J 20/28016* (2013.01); *B01J 20/32* (2013.01); *B01J 20/3204* (2013.01); *B01J 20/3231* (2013.01)

(58) Field of Classification Search
CPC .... B01J 20/32; B01J 20/3231; B01J 20/3204; B01J 20/26; B01J 20/28016
See application file for complete search history.

(56) References Cited

U.S. PATENT DOCUMENTS

| | | | | |
|---|---|---|---|---|
| 6,547,854 | B1 * | 4/2003 | Gray | B01D 53/02 95/139 |
| 7,288,136 | B1 * | 10/2007 | Gray | B01D 53/1475 95/139 |
| 8,658,561 | B2 * | 2/2014 | Li | B01J 20/28014 502/402 |
| 9,333,485 | B1 * | 5/2016 | Siriwardane | B01J 20/3287 |
| 2006/0165574 | A1 * | 7/2006 | Sayari | B01D 53/02 423/210 |
| 2010/0292072 | A1 * | 11/2010 | Gray | B01J 20/26 502/56 |
| 2015/0352518 | A1 * | 12/2015 | Meirav | B01J 20/08 502/401 |
| 2018/0100065 | A1 * | 4/2018 | Gray | C08L 79/02 |

OTHER PUBLICATIONS

Gray, M.L.; Soong, Y.; Champagne, K.J.; Baltrus, J.; Stevens, R.W.; Toochinda, P.; Chuang, S.S.C. Separation and Purification Technology 2004, 35, 31-36.*

Arenillas, A.; Smith, K.M.; Drage, T.C.; Snape, C.E. Fuel 2005, 84, 2204-2210.*

* cited by examiner

*Primary Examiner* — Rip A Lee
(74) *Attorney, Agent, or Firm* — Jacob A. Heafner; Michael J. Dobbs; Brian J. Lally

(57) ABSTRACT

The disclosure describes a pelletized sorbent comprising a first component comprising Basic Immobilized Amine Sorbent, a second component comprising inorganic strength additive, and a third component comprising polymer binder, where the Basic Immobilized Amine Sorbent and solid inorganic strength additive are interconnected by the polymer binder. The pelletized sorbent is useful for removing $CO_2$ from a gaseous mixture such as a post combustion gas stream.

22 Claims, 11 Drawing Sheets

PELLETIZED IMMOBILIZED AMINE SORBENT FOR $CO_2$ CAPTURE

CROSS-REFERENCE TO RELATED APPLICATION(S)

The present patent/application claims priority to U.S. Provisional Patent No. 62/233,493 filed Sep. 28, 2015, and entitled "A PELLETIZED BASIC IMMOBILIZED AMINE SORBENT (BIAS) UTILIZING FLY ASH AND POLYMER BINDERS" the contents of which are incorporated by reference.

GOVERNMENT INTEREST

The United States Government has rights in this invention pursuant to the employer-employee relationship of the Government to the inventors as U.S. Department of Energy employees and site-support contractors at the National Energy Technology Laboratory.

FIELD OF THE INVENTION

The disclosure provides a pelletized sorbent for removal of carbon dioxide from a gaseous mixture. The pelletized sorbents are comprised of Basic Immobilized Amine Sorbent particles, inorganic strength additive, and a polymer binder.

BACKGROUND OF THE INVENTION

Carbon sequestration is a viable alternative to reduce the emissions of the greenhouse gas carbon dioxide ($CO_2$) from large point sources. It holds the potential to provide deep reductions in greenhouse gas emissions. Carbon sequestration is a two-step process where the capture of carbon dioxide from a gas stream is followed by permanent storage. The capture step for carbon dioxide represents a major cost in the overall process.

Of particular interest are power generation point sources that use fossil fuels. Since nearly one-third of the anthropogenic $CO_2$ emissions are produced by these facilities, conventional coal-burning power plants and advanced power generation plants—such as integrated gasification combined cycle—present opportunities where carbon can be removed and then permanently stored. At the current time, pulverized coal-fired-base steam cycles have been the predominant electric power generation technology. These will continue to be used predominantly in the near future. Technologies for capturing $CO_2$ will need to be applied to new more efficient coal-fired facilities and will need to be retrofitted onto existing plants.

Effective amine-based solid sorbent methodologies are needed for carbon dioxide capture from a gaseous mixture, whether the capture occurs in combustion or gasification power generation systems from flue gas, or in other applications such as natural gas sweetening. Because of the high concentration of carbon dioxide in any of these feed streams, a large quantity of the gas will react with the sorbent and thus produce considerable amounts of exothermic heat. This heat must be removed from the sorbent to prevent temperature instability within the reactor, to assure the sorbent will operate at optimum temperature, and to eliminate the potential degradation of the sorbent because of high temperature excursions.

For coal-fired power plants, the conventional scrubbing system that is currently the comparative baseline for all other capture technologies is monoethanolamine (MEA) scrubbing. This wet scrubbing process removes the $CO_2$ in an absorber and then regenerates the spent scrubbing liquor in a vessel by indirectly heating the solution with plant steam. Although there have been large scale commercial demonstrations of this technology, the process has several disadvantages, such as a high heat of reaction, low working capacity, corrosiveness of the solution, the susceptibility of being poisoned, and most notably, its need to be in an aqueous solution. This latter disadvantage results in a large energy need to regenerate the spent solution, especially the sensible heating of the water, which is a minimum of 70 wt % of the solution. The water is recognized as an inert carrier between the absorption and regeneration steps. Another energy loss while regenerating the spent MEA solution includes evaporative heat loss of vaporizing liquid water.

One type of novel $CO_2$ capture technology that can be applied to various gas streams has, as a basis, dry regenerable solid sorbents. Examples of these types of sorbents are zeolites, activated carbon, alkali/alkaline earth metals, immobilized amines, metal organic framework, etc. A specific sorbent category that shows significant advancement are amine-based solid sorbents, such as Basic Immobilized Amine Sorbents (hereinafter BIAS). BIAS consist of amines (primary, secondary, tertiary, or a combination thereof) deposited onto a porous support. The manner of deposition can be random or a structured deposition of the amine onto this support (silica, polymer, etc.). When used in the industrial setting, the dry solid sorbent process may act in a similar fashion to the wet scrubbing process in that the sorbent would be transported between an adsorption step and a regeneration step and in that the sorbent is regenerated by a temperature-swing application.

One of the main benefits in using the solid sorbent is the elimination of the sensible heat for the liquid water as compared to MEA. A secondary benefit lies in the lower heat capacity for the solid versus the liquid solvent, also serving to lower the sensible heat required. More $CO_2$ can be adsorbed on a weight or volume basis with the amine-based solid sorbents, so the sorbent system is capable of a significant decrease in the heat duty for the regeneration step. A lower cost of energy service for process involving BIAS as compared to amine wet scrubbing may also result. Thus amine-based solid sorbents have the capability to improve the overall energetics of $CO_2$ capture.

Unfortunately, reactor designs which are amenable to flowing solid sorbents present issues with management of those mobile solid sorbent. For example, sorbents of a particle size capable of efficient $CO_2$ adsorption are often easily aerosolized, carried into a flue stream, and progressed further through the reactor system where they cause damage to downstream components and are overall lost. Sorbent particles of sufficient size to not be at risk for being aerosolized are significantly less efficient at sorption per unit mass, which leads to an increase in the mass of sorbent required. Further, sorbent particles themselves are vulnerable in industrial processes as they do not have the structural integrity necessary for prolonged use in reactors. Where the sorbent has low structural integrity and readily breaks down, greater material investment is required and the sorbent becomes less economical to utilize over other competing materials and methods.

Basic Immobilized Amine Sorbents (BIAS or sorbents) and their associated processes are among the most widely studied solid sorbents to mitigate post-combustion carbon dioxide ($CO_2$) emissions. BIAS are organized into three classes (1-3) according to their preparation procedure and amine immobilization mechanisms. Class 1 sorbents are generally prepared by dry or wet impregnation of a support, namely different grades of silica, with a polyamine/hydrophilic solvent (methanol, ethanol, etc.) mixture. Principal polyamines employed are tetraethylenepentamine (TEPA), polyethylenimine (PEI), and generally various linear or branched polyamines that possess different ratios of —$NH_2$ (primary)/—NH (secondary)/—N (tertiary) amine groups that can potentially adsorb $CO_2$. These polyamines are bound to the supports by Si—OH...—$NH_2$ hydrogen bonding and also ionic $SiO^-$...—$NH_2^+$/—$NH^+$ interactions. Primary and secondary amines can capture $CO_2$ under dry and wet conditions while tertiary amines primarily capture $CO_2$ only under humid conditions. The manner of amine deposition on the support can be random or structured deposition of the amine onto the support. In addition to silica, other supports may include clays, polymers, activated carbons, zeolites, and others.

Class 2 sorbents are typically prepared by wet impregnation of a mixture of a reactive aminosilane and anhydrous hydrophobic solvent, usually toluene, onto a dry, pre-treated silica support. Strict control of the $H_2O$ content within the system is maintained to manipulate the subsequent grafting reaction between the aminosilane and the silica support. The grafted aminosilanes are immobilized to the silica support via covalent Si—O—Si linkages. These Si—O—Si linkages are also responsible for immobilizing the aminosilane within the bulk of the pore via polymerization.

BIAS sorption capacity is typically calculated either on a weight-percent-of-sorbent basis or mmol $CO_2$/g-sorbent basis. For weight percent basis, the weight of adsorbed $CO_2$ is divided by the weight of sorbent and multiplied by 100. For the mmol $CO_2$/g-sorbent basis, the weight of adsorbed $CO_2$ is divided by the molecular weight of $CO_2$ (44 g/g-mole), multiplied by 1,000, and divided by the sorbent weight. The sorption capacity of a pelletized sorbent is best measured by exposing the pellet to a $CO_2$ concentration of ppm level to 100% $CO_2$ at 0 to 120° C. for a period of time until the maximum amount of $CO_2$ is adsorbed by the sorbent, usually less than or equal to 1 hour. Preferential determination of pellet $CO_2$ capture capacity involves placing the pellet in a thermogravimetric analyzer (TGA) or fixed bed reactor and exposing the pellet to 10-15 vol % of flowing $CO_2$ and 0 to 10 wt % $H_2O$ with a balance of either air or inert He or $N_2$ at 40-75° C. The $CO_2$ concentration range and adsorption temperature here are either in the range of coal-fired power plant flue gas, or can be achieved with minimal process modification. The pellet is first heated at 100-110° C. for 10-60 min under flowing air or an inert gas to remove any pre-adsorbed water or $CO_2$ (from the environment). To determine the $CO_2$ capture capacity of the pellet in the case of the TGA system, the final weight of the sorbent after $CO_2$ adsorption is subtracted from the initial weight of the sorbent after pre-treatment, and the weight difference is used to calculate the $CO_2$ capture capacity. In the case of the fixed bed, $CO_2$ gas concentration profiles from an effluent measuring device, such as a mass spectrometer, are analyzed and used to calculate the $CO_2$ capture capacity of the pellet.

Advancements in reactor design from batch, fixed-bed systems to continuous circulating fluidized bed, rotating disk, and moving bed systems, and development of a steam-stable sorbent under practical conditions are promising milestones towards commercialization. However, the aforementioned inherent difficulties in the application of such a small particle-size sorbent to industry scale processes remain. For example, BIAS degrades structurally over time as the material is moved from one industrial environment to another. Additionally, the light BIAS can be picked up by and carried into a gas stream, leading to loss of the material and degradation of components downstream. Further, the current amine based sorbent technology utilized in $CO_2$ separation is that the impregnated liquid amines of the BIAS sorbents are vulnerable to leaching from the sorbent pores by condensed steam during practical $CO_2$ adsorption-desorption testing under humidified conditions. The deleterious effect of steam on the $CO_2$ capture of BIAS materials is widely seen in the literature, and was attributed to, in part, amine leaching from the sorbents. Additional difficulties with small particle sorbents include high energy costs to overcome large pressure drop across sorbent beds and failure of, specifically, internal moving parts (valves, conveyors, etc.) by agglomerated or aerosolized particles. Because of these issues, pelletization of immobilized amine sorbents is advantageous for their large scale application.

It would be advantageous to provide a pelletized sorbent for $CO_2$ capture using an amine-based solid sorbent, where the pelletized sorbent is capable of efficient $CO_2$ sorption while maintaining an appropriate mass and structural integrity for use in a post-combustion separation system. Such a pelletized sorbent would achieve acceptable $CO_2$ adsorption while being of an optimized volume and mass for incorporation of large loads of the sorbent into a post-combustion reactor system. Additionally, the pelletized sorbent would more easily provide for integration with existing power or fuel production facilities than current solid sorbents. Thus, through utilization of the pelletized sorbent, increases in $CO_2$ capture capability while minimizing energy and infrastructure requirements is realized.

Accordingly, it is an object of this disclosure to provide a pelletized sorbent for $CO_2$ capture comprising: a Basic Immobilized Amine Sorbent, an inorganic strength additive, and a polymer binder.

These and other objects, aspects, and advantages of the present disclosure will become better understood with reference to the accompanying description and claims.

SUMMARY OF THE INVENTION

The disclosure describes a pelletized sorbent comprising a first component comprising Basic Immobilized Amine Sorbent, a second component comprising inorganic strength additive, and a third component comprising polymer binder, where the Basic Immobilized Amine Sorbent and solid inorganic strength additive are interconnected by the polymer binder. The pelletized sorbent is useful for removing $CO_2$ from a gaseous mixture such as a post combustion gas stream.

As illustrated in FIG. 1, the pelletized sorbent comprises at least the three components; Basic Immobilized Amine Sorbent, an inorganic strength additive depicted (as fly ash (FA)), and a polymer binder. The polymer binder interconnects the Basic Immobilized Amine Sorbent and inorganic strength additive to form an agglomerated pellet capable of $CO_2$ sorption. The interconnection is a result of both physical binding of the constituents as well as chemical bonding of the polymer binder to the Basic Immobilized Amine Sorbent and inorganic strength additive, thus providing added strength to the pelletized sorbent. The pelletized sorbent features high crush strength, high attrition resistance, good $CO_2$ capture, and hydrophobicity for use in gas separation operations.

The pelletized sorbents are capable of removing $CO_2$ from a gaseous mixture where the gaseous mixture necessarily comprises either pure $CO_2$ or a mixture of $CO_2$ and at least one other gas. An exemplary gaseous mixture is a post-combustion gas stream from power generation. Such a flue gas stream would comprise $N_2$ and $CO_2$ as its primary constituents. Removal in another exemplary gaseous mixture is the sweetening of raw natural gas, where a stream of raw piped gas primarily comprising primarily $CH_4$, varying amounts of other hydrocarbons, and $CO_2$ is sweetened by removal of the $CO_2$, such removal accomplished by the pelletized sorbent.

The pelletized sorbents separate $CO_2$ from the gaseous mixture by sorption of the $CO_2$. The pelletized sorbents primarily absorb the $CO_2$ by first external diffusion of $CO_2$ from the bulk gas stream to the surface of the pellet; followed by diffusion of $CO_2$ into the bulk pellet structure; then pore diffusion into the BIAS particles comprising the pellet; and subsequent reaction of $CO_2$ with BIAS amine groups. Reaction of $CO_2$ with the amines will primarily form ammonium-carbamate ion pairs, and potentially carbamic acid and bicarbonate (in the presence of $H_2O$).

In a preferred embodiment, the pelletized sorbent comprises a first component comprising a Class 1, Class 2, or hybrid Class 1/Class 2 BIAS in the range from about 68% to about 85% of the total dry pelletized sorbent weight; a second component comprising fly ash inorganic strength additive, in the range from about 5% to about 37% of the total dry pelletized sorbent weight; a third component comprising a polymer binder interconnecting the BIAS and the strength additive; a $CO_2$ sorbent capacity greater than 1.7 mmol/g; a crush strength equal to or greater than 1.0 MPa or attrition value less than 1% after 24 hr; and a PCR value greater than 50%.

DETAILED DESCRIPTION OF THE INVENTION

Figure 1:
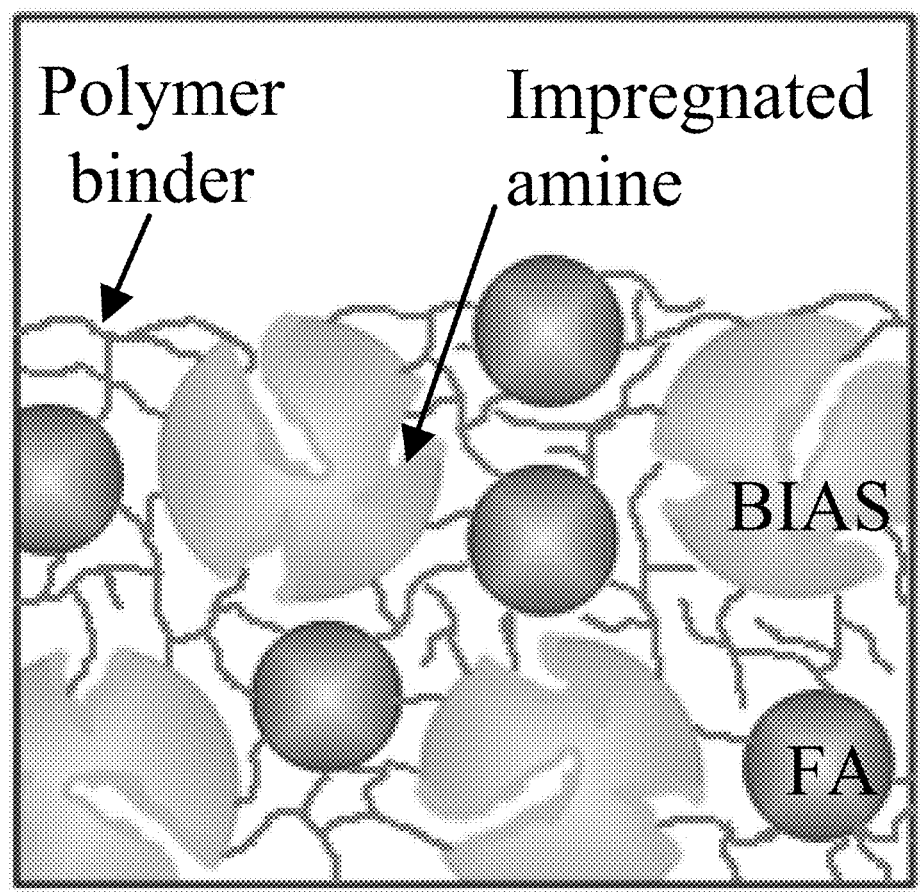
FIG. 1. Illustrates the internal structure of a pelletized sorbent.

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a pelletized sorbent for $CO_2$ capture comprising Basic Immobilized Amine Sorbent, an inorganic strength additive, and polymer binder.

The pelletized sorbent is an agglomeration of the constituent materials comprising at least Basic Immobilized Amine Sorbent, an inorganic strength additive, and polymer binder. The pelletized sorbent may further compromise additives such as amines, dispersants, and non-ionic surfactants or other like materials to enhance structural integrity or $CO_2$ migration throughout the pellet. Preferred BIAS for pelletization include Class 1, Class 2, or hybrid class 1/class 2 sorbent types. Preferred sorbents have silica as the support and amine species that possess any combination of primary and secondary amines. These sorbents are all capable being pelletized using the combination of inorganic strength additives and polymer binders as disclosed herein.

Chemical characteristics of the BIAS supports such as silica and zeolite promote binding of sorbent pellet constituents. For example, the Si—OH groups of silica-supported amine/silica sorbents and also Al—OH groups of amine/zeolite sorbents interact chemically with aromatic benzene. These aromatic groups are present on polymer binders such as polystyrene, with the resulting polymer-BIAS interactions serving to increase the mechanical and structural integrity of the final pelletized sorbents.

Preferred porous supports of the BIAS includes any grade of silica with an amorphous, crystalline, or combination of amorphous and crystalline structure. Preferred types and structures of silica include precipitated, fumed, gel, SBA-15, and those with ordered mesoporous structures such as MCM-41. Preferred physical properties of the BIAS silica support include a surface area (BET) between 0 and 2,000 $m^2/g$, and a pore volume (BJH) between 0 and 5 $cm^3/g$.

Preferred amines for the BIAS are polyamines that contain more than one as well as any combination of the following amine groups: primary ($—NH_2$), secondary ($—NH$), and tertiary ($—N$) amines. These polyamines could be nearly pure single components or a combination of different polyamines. Examples of some polyamines used in the BIAS include the following: ethylenimine oligomer mixture ($EI_{423}$, linear/branched mixture, $—N/—NH/—NH_2$ ratio of 1.3:1:2.2), polyethylenimine with molecular weights between 400 and 20,000 (PEI, $—N/—NH/—NH_2$ ratio of 1.3:1:1.7 for $PEI_{800}$), E100 (linear, cyclic, branched mixture), tetraethylenepentamine (TEPA, linear, $—N/—NH/—NH_2$ ratio of 0:1:0.7), pentaethylenehexamine, and hexaethyleneheptamine. Furthermore, these examples of amines and other potential amines should have but are not limited to a molecular weight (MW) range between 180 and 20,000 g/g-mole to avoid excessive loss from the BIAS at $CO_2$ desorption temperatures (100 to 110° C.) (lower MW values) and to minimize $CO_2$ diffusion limitations (higher MW values). Preferentially, BAIS sorbents may possess an amine loading between 1 and 65 wt %. Preferred BIAS sorbents possess an amine loading between 20 and 45 wt %. More preferred BIAS sorbents possess an amine loading between 45 and 65 wt %.

The BIAS in the pelletized sorbent are the primary constituents responsible for the $CO_2$ capture of the pelletized sorbents. Preferred $CO_2$ capture capacity of the starting BIAS particles before pelletization is from about 0.1 to about 1.0 mmol $CO_2$/g. More preferred $CO_2$ capture capacity of the BIAS before palletization is from about 1.0 to about 2.8 mmol $CO_2$/g. Most preferred BIAS possess $CO_2$ capture capacity before pelletization greater than about 2.8 mmol $CO_2$/g.

The physical characteristics of the BIAS are critical to their incorporation into the pelletized sorbent. The BIAS powders are preferentially 1 nm to 25 µm in diameter. Further, BIAS particles may be ground prior to pelletization. Such grinding serves to process the particles into a size preferential for incorporation into a pellet as well as expose a greater number of functional groups for $CO_2$ capture.

Typical pelletized sorbents are comprised of at least 50% Basic Immobilized Amine sorbent by total dry pelletized sorbent weight, where total dry pelletized sorbent weight includes the mass of the BIAS, inorganic strength additive, polymer binder, and any loaded amines, surfactants, or other additives to enhance pellet $CO_2$ capture performance. Preferred pelletized sorbents are comprised of from about 63% to about 92% by total dry pelletized sorbent weight. More preferred pelletized sorbents are comprised of from about 68% to about 85% by total dry pelletized sorbent weight.

Inorganic Strength Additives:

In addition to the Basic Immobilized Amine Sorbents, the pelletized sorbents comprise one or more inorganic strength additives. The inorganic strength additive provides a single or plurality of solid substrate which primarily serve to provide structural support to the pellet. As discussed supra, BIAS, when used directly in gas separation operations, presents difficulties when used at an industrial scale. Thus, addition of an inorganic strength additive, in part, facilitates the structural integrity of the basic immobilized amine sorbent based pellet thereby structural degradation and material loss is avoided.

Ideal inorganic strength additives are available in large quantity, inexpensive, do not drastically decrease the $CO_2$ capture capacity of the sorbents, and provide a medium capable of increasing the structural integrity of the pellet. Additionally, inorganic strength additives ideally are able to bond either chemically or physically to the other constituents of the pelletized sorbent. Exemplary inorganic strength additives, in addition to fly ash, include bottom ash; clays; activated carbon; and oxide materials themselves typically comprising fly ash, namely silicon dioxide, aluminum oxide, and calcium oxide.

In one embodiment, the inorganic strength additive is fly ash. Fly ash, also known as pulverized fuel ash, is commonly produced as a solid product of coal combustion where the fly ash is carried by and later captured from the flue gas. Fly ash is available in a variety of dimensions and compositions.

Fly ash compositions include functional groups on the surfaces of the fly ash particles which promote agglomeration by chemical bonding. For example, select polymer binders may hydrogen bond to fly ash to promote the formation of pellets and increase their end crush strength. Exemplary functional groups on the fly ash include hydroxyl groups, carboxylic acid groups, and oxides. Fly ash may also be functionalized with chemical groups, such as with ammonia or amines to introduce amine groups.

As shown in Table 1, fly ash as used in pelletized sorbents is primarily comprised of silica and alumina. However, as a product of primarily coal combustion, the exact composition of other potential fly ash materials may vary depending on the combustion source. Advantageously, both silica and alumina can hydrogen bond to the amine groups of the sorbents and the polymer binder to promote the formation of pelletized sorbent. Therefore, it is expected that other fly ash sources are capable of assisting pellet formation for the sorbents.

TABLE 1

Fly ash major oxides content as wt % and mol %.

| Components | wt. % | mol. % |
|---|---|---|
| $Al_2O_3$ | 25.59 | 17.92 |
| CaO | 1.55 | 1.97 |
| $Fe_2O_3$ | 5.02 | 2.24 |
| $K_2O$ | 2.92 | 2.21 |
| MgO | 0.79 | 1.4 |
| MnO | 0.05 | 0.05 |
| $Na_2O$ | 0.56 | 0.65 |
| $P_2O_5$ | 0.07 | 0.04 |
| $SiO_2$ | 61.02 | 72.52 |
| $TiO_2$ | 1.11 | 0.99 |
| Loss on Ignition | 1.33 | |

The dimensions (particle size) of the inorganic strength additive allow greater incorporation of the strength additive into the other materials comprising the pellet sorbent. Denser packing of smaller inorganic strength additive particles between larger sorbent particles could strengthen the pelletized sorbent as previously stated. Inorganic strength additive sizes range from about 1 nm to about 25 µm. In a preferred embodiment, inorganic strength additive particle sizes range from about 1 nm to about 2.0 µm.

Figure 2:
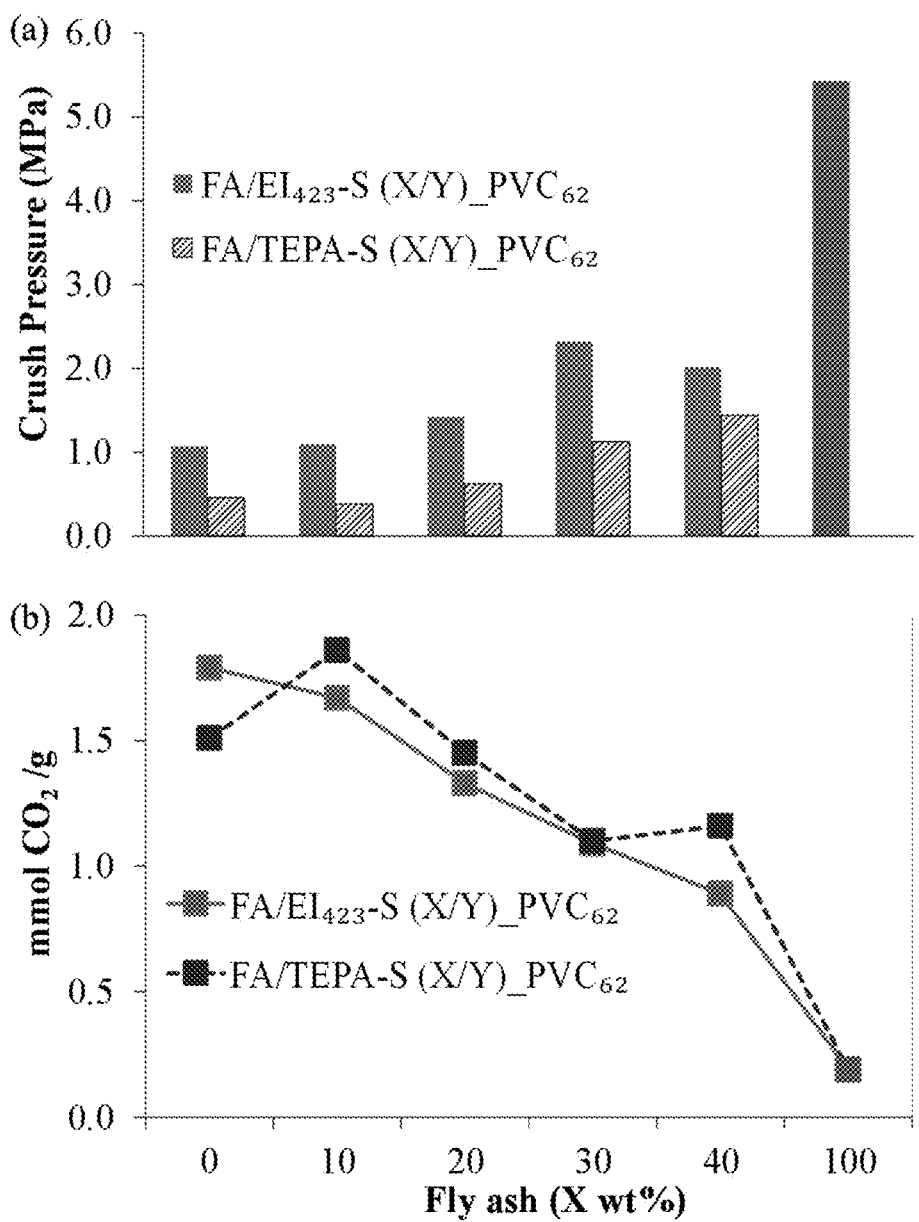
FIG. 2. Illustrates the effect of fly ash content on the (a) mechanical crush strengths and (b) $CO_2$ capture capacities of pelletized sorbent.

FIG. 2 shows the effect of the inorganic strength additive fly ash on the average crush strengths (MPa in $P_{crush}$) of pellets prepared from a BAIS sorbent containing 50 wt % ethylenimine, MW=423/silica, labeled $EI_{423}$-S, or 50 wt % tetraethylenepentamine (TEPA)/silica, labeled TEPA-S. Crush strength of the final pelletized sorbent (pellets) is an accurate measure of the structural integrity and mechanical strength of the material. Crush strength is defined and calculated as the pellet crush weight divided by the cross-sectional area of the pellet (area=diameter times length). The crush weight is represented as an average of three crush tests, where the standard deviation is less than 15%. In FIG. 2, the fly ash content is reported as X/Y (Y=100−X), where X/Y is the wt % ratio of FA/sorbent in the dry mixture (FA plus sorbent). This X/Y ratio does not include the content of the polymer binder, or additional amine added together with the polymer binder to the pellet. Overall the final composition of the pellets in FIG. 2 includes 10 wt % polymer binder (poly (vinyl chloride), PVC), 5 wt % of added amine (TEPA), and between 8 wt % (X/Y=10/90) and 35 wt % (X/Y=40/60) fly ash. Increasing the strength additive (fly ash, average particle diameter=1.7 nm) content from X/Y=0 to 40 wt % for $EI_{423}$-S-based and TEPA-S-based sorbent pellets enhanced their mechanical strength by a factor of 1.9 and 3.1, respectively. Furthermore, dense packing of smaller strength additive (fly ash) particles ($D_{P,avg}$=1.7 µm) between larger sorbent particles strengthened the pellet by mechanically interlocking the particles, and also reducing voids that would weaken the pellet.

In the final pelletized sorbent (pellets), the inorganic strength additive may range from about 5 wt % to about 37 wt % of total dry pelletized sorbent weight. Preferentially, the inorganic strength additive ranges from about 8 wt % to about 37 wt % of total pelletized sorbent. More preferentially, the fly ash composition is from about 18 wt % to about 37 wt % of total pelletized sorbent.

Polymer Binders:

In the pelletized sorbent, the Basic Immobilized Amine Sorbents and inorganic strength additives are agglomerated via a polymer binder. Polymer binders serve to interconnect the respective components to form a rigid network suitable for structurally stabilizing the pellet through chemical, physical, or a combination of chemical and physical bonding. In one example, the polymer binder polyvinyl chloride (PVC) operates by way of introducing a polymer network which physically entraps the BIAS and inorganic strength additive particles.

The mechanism responsible for the agglomeration may be physical, chemical, or both physical and chemical. In physical agglomeration, the agglomerated components are physically intertwined by the polymer binder. The binding polymer interactions, in part, create a network of physical cross-links which contribute to the pellet strength.

Figure 3:
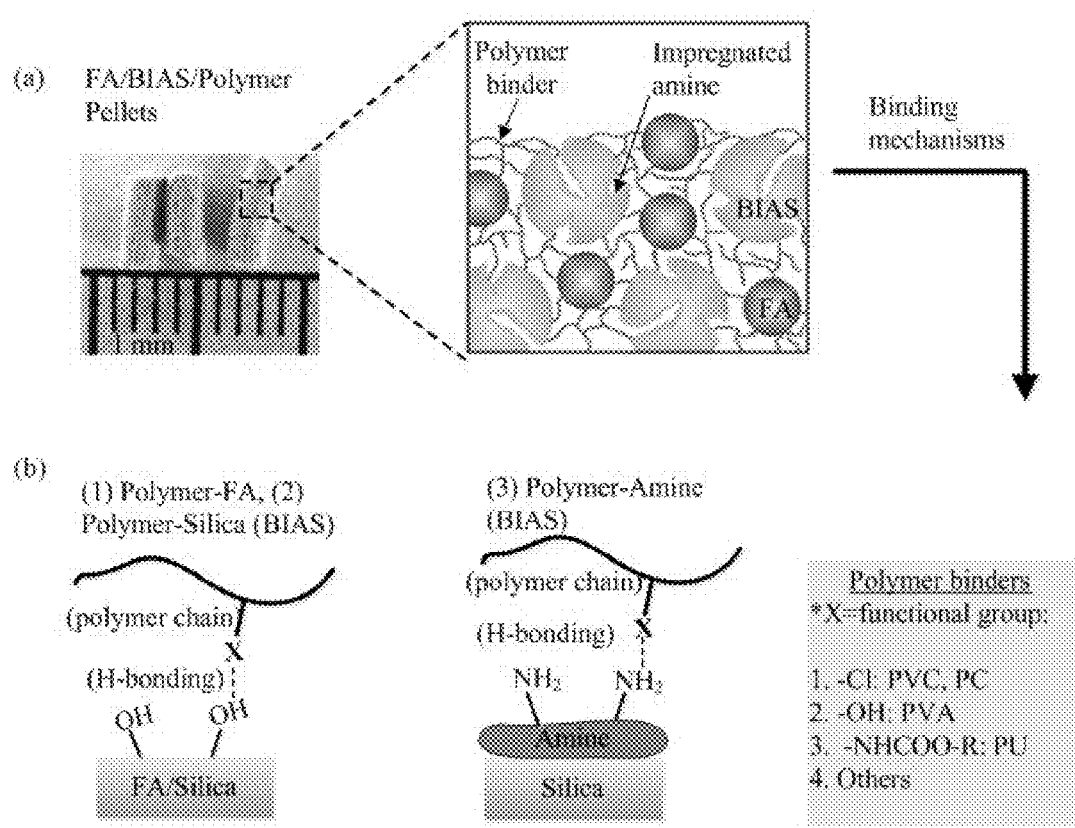
FIG. 3: Illustrates the pelletized sorbent (a) structure and (b) H-bonding mechanisms.

With respect to chemical bonding, the polymer binder functions primarily through two types of chemical interactions, hydrogen bonding (H-bonding) and covalent bonding (cross-linking). Hydrogen bonding in general involves the electrostatic interactions between H atoms attached to electronegative atoms such as N, O, and other electronegative atoms attached to molecules in close proximity. FIG. 3(a) shows the interconnected network of the BIAS pellets comprised of BIAS and fly ash as strength additives dispersed within a polymer binder. The schematic of FIG. 3(b) shows that three different H-bonding mechanisms within the pellet are possible. Mechanisms (1) and (2) involve interactions between functional groups of the polymer binder chains and the surface hydroxyl groups (—OH) of either a silica-type support of the BIAS sorbent or the fly ash particles. The polymer binder possess functional groups, such as chlorine (—Cl) groups for PVC or poly (chloroprene) (PC), hydroxyl groups (—OH) for PVA, urethane (—NHCOO—R) groups for polyurethane (PU), or other electronegative atoms that interact with the H atoms of the fly ash or silica —OH groups to adhere the polymer binder to the fly ash and sorbent.

The long polymer binder chains of the polymer binder entangle through intermolecular or intramolecular H-bonding which further contributes to the pellet strength. Mechanism (3) of FIG. 3(b) involves H-bonding interactions between the polymer binder and the amines coated on the BIAS. Polymer binders, in addition to PVC and PC, may adhere the pellets through hydrogen bonding of their various functional groups.

In one embodiment, the polymer binders are hydrophobic. Hydrophobic polymers can be described generally in three different ways, which are not wetted by water, i.e. the contact angle of a small droplet is greater than zero, not soluble in water, or minimally absorbing or adsorbing adsorb. In contrast, materials that are wetted by water, dissolve in water, or absorb appreciable amounts of water are considered hydrophilic. Hydrophobic polymers accompany material such as the poly(chloroprene) (PC), PVC, polystyrenes, polyurethanes, and epoxies. Hydrophobic polymers are one method by which to impart the necessary hydrophobicity to the pellets. In another embodiment, the polymers are hydrophilic; wetted by water, dissolve in water, or absorb/adsorb water These polymers can include poly (vinyl alcohol), poly (vinylpyrrolidone), and poly (acrylamide). To impart hydrophobicity to the pellet, a hydrophobic additive such as those polymers previously mentioned would be included in the BIAS. In general, pellets can be prepared either with a hydrophobic sorbent and a hydrophilic polymer binder, or a hydrophilic sorbent and a hydrophobic polymer binder.

Preferred polymer binders include the following polymers, preferred functional groups of these and of modified versions of these polymers include the following: F (fluorine atom)-poly(vinylidene fluoride), poly(tetrafluoroethylene); acetal (RCOR)-poly(vinyl acetate); Cl (chlorine atom)-isoprene, polyisoprene, chlorinated polyethylene; ether (ROR)-poly(vinylbutyral), poly(vinylbutyral-co-vinylalcohol-co-vinylacetate), poly(vinyl chloride-co-vinyl acetate-co-vinyl alcohol), poly(ethyl vinyl ether), poly(vinyl formal); ester (RCOOR)-polyester poly(tert-butyl acrylate), poly(vinyl cinnamate); carbonate (RCOO$^-$)-polycarbonate, polypropylene carbonate); carboxylic acid (RCOOH)-poly(vinyl chloride-co-acrylic-acid); nitrile-poly(acrylonitrile), and poly(acrylonitrile-co-butadiene); imide (RCO)$_2$NR; and amide (RCONR). Polymers containing any of these preferred functional groups is included. Co-polymers comprised of more than one of these preferred polymers is also included.

In one example, poly (vinyl alcohol) (PVA), which has —OH groups and poly (vinyl acetate) (PVAc), which has —OC=O— groups, are alternatives to PVC that can hydrogen bond to fly ash and BIAS to form pelletized sorbents. The aryl groups of polystyrenes can interact with Si—OH groups of amine/silica sorbents and also Al—OH groups of zeolite.

Physical modification of the constituents also promotes pelletization via increasing bonding among the polymer binder. Physically grinding the BIAS before pelletization exposes bulk amine groups previously inside the sorbent pores. In one instance, the exposed, high-viscosity EI$_{423}$ of the pellets in FIG. 2 would interact with the PVC binder and resist the compressive force during crush testing. In other words, available —NH$_2$ and —NH groups of viscous immobilized amines, in general, play an increased role in binding the pelletized sorbents. Furthermore, the strength additive can also be ground for providing added pellet strength.

Polymer binders may also be modified to include functional groups which enhance CO$_2$ sorption. In one embodiment, polymer binders are modified to comprise amine functional groups. During experimental studies, pelletized sorbents comprising PVC formed ammonium ions while heating at the CO$_2$ desorption temperature of 105° C. for 100 min. Ammonium ions were formed via protonation of the amines by HCl, which was generated, in part, by the elimination and substitution reactions of PVC with highly basic aliphatic amines of the BIAS sorbent or binder solution. These protonated amines cannot absorb CO$_2$ which decreases overall CO$_2$ capture capacity during long term cycling. Modification of PVC with a less basic aromatic amine, for example p-phenylenediamine (PPD), before pelletizing favors the substitution reaction to form —NH groups, which capture CO$_2$, and reduce the chlorine content of PVC. Reduced chlorine in the modified exemplary PPD-PVC binder discourages the formation of harmful HCl during cycling of the pelletized sorbent. Additional species that may be used to modify the PVC binder in addition to PPD include aniline, o-toluidine, diaminotoluenes, n-methylaniline, and diphenylamine.

PVC may also be modified by reacting it with a strong organic or inorganic base or nucleophile in the liquid or solid phase, utilizing the elimination reaction, where the resulting PVC will be dechlorinated to form HCl. This HCl can then be neutralized by rinsing the modified PVC (initially solid or precipitated from solution) with an aqueous inorganic base solution. Organic nucleophiles may include linear polyamines such as ethylenediamine, tetraethylenepentamine, and poly(ethylenimine), and choline hydroxide. Inorganic nucleophiles/bases include sodium carbonate, sodium hydroxide, other metal-hydroxide species, potassium thiocyanate, sodium iodide.

Preferentially, pelletized sorbents comprise those polymer binders with chlorine groups such as PVC and PC. Other polymer binders include the hydroxyl group polymer PVA, followed by PVAc (acetate groups) then polystyrene (aromatic benzyl groups).

The pelletized sorbents are typically comprised of 1 to 15 wt % of the total dry pelletized sorbent as polymer binder. Preferential total dry pelletized sorbent weight percent of polymer binder is from about 5% to about 15 wt %. More preferably, the polymer binder comprises from about 8% to about 15% dry pelletized sorbent weight percent.

Figure 4:
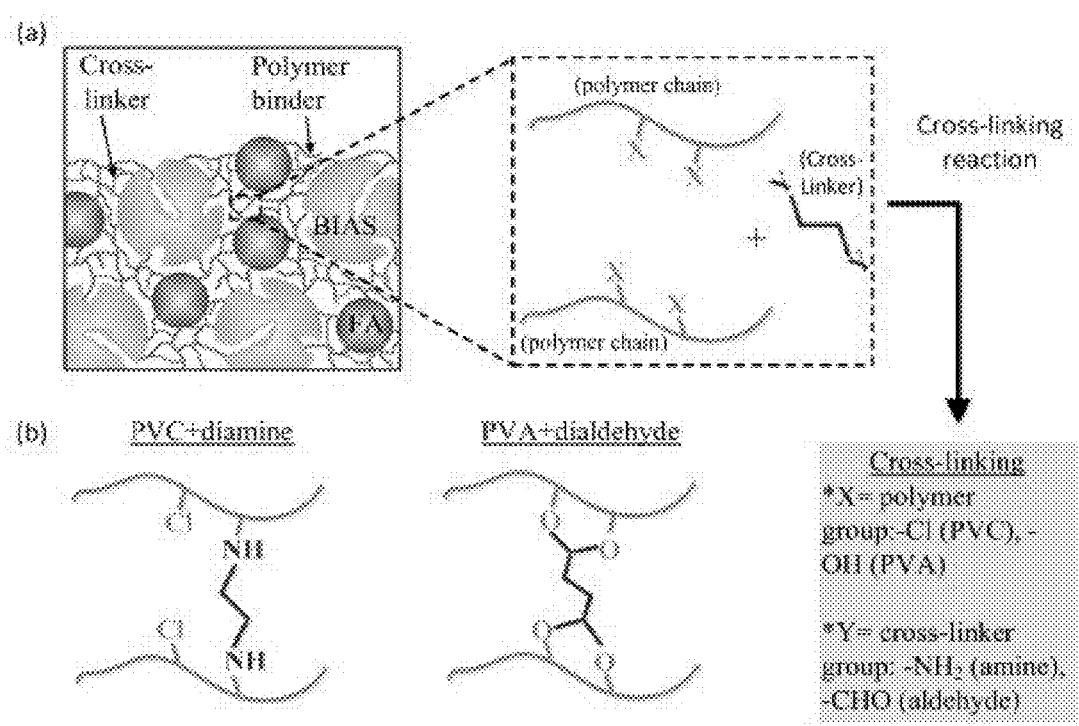
FIG. 4 Illustrates use of (a) a cross-linker and (b) the structure of cross-linked material using a diamine for poly(vinyl chloride) (PVC) and a dialdehyde for poly(vinyl alcohol) (PVA).

Additives:

In one embodiment, the pelletized sorbents contain additives. A cross-linker additive introduces covalent bonding as a pellet binding mechanism, attaching two or more polymer chains within the network together via the cross-linker. As shown in FIG. 4, polymer binder chains are interconnected via chemical bonds with a cross-linker having at least two reactive functional groups, one each bond to a polymer binder. Cross-linkers act beneficially to increase pellet mechanical strength and also increase hydrophobicity. FIG. 4(b) illustrates that pellets bound with PVC are cross-linked with a diamine ($NH_2$—R—$NH_2$), where each of the primary amine groups (—$NH_2$) chemically react with and join different PVC chains. Exemplary amine molecules possessing two or more —$NH_2$ groups may include tetraethylenepentamine, polyethylenimine, phenylenediamine, and 1,6-hexanediamine.

Alternatively, pellets preferentially bound with PVA or a combination of PVA and polyethylenimine (PEI) are cross-linked with a dialdehyde (OHC—R—CHO), where each aldehyde (—CHO) group reacts with different PVA chains via two hydroxyl (—OH) groups on each chain to form the interconnected polymer network. A dicarboxylic acid could cross-link PVA. Exemplary dialdehydes may include linear glutaraldehyde and aromatic, hydrophobic terephthalaldehyde.

Other preferred cross-linking compounds are molecules bearing more than one epoxy group, such as different forms of bisphenol A diglycidylether (di-epoxy), N,N-Diglycidyl-4-glycidyloxyaniline (tri-epoxy), and 4,4'-Methylenebis(N,N-diglycidylaniline) (quart-epoxy groups). These epoxies covalently join multiple amine molecules together to form a network. These amine molecules could be those of the BIAS sorbents being pelletized, or could be additional amine species added together with the epoxy in the polymer binder solution. Other preferred cross-linkers include aminosilanes (with amine groups) or alkoxysilanes (without amine group) and possessing methoxy/ethoxy ($ROCH_3/ROCH_2CH_3$) groups, such as—aminopropyltrimethoxysilane, aminopropyltrimethoxysilane, N-(3-(trimethoxylsilyl) propyl)ethylenediamine, tetrathyeleorthosilicate. Commonly known cyanate/isocyanate (ROCN/RNCO), and acrylate and cyanoacrylate can also be used with a polyol (multiple —OH groups of an alcohol) molecule to covalent bind the pellet sorbent.

In one embodiment, loaded amines are additives to the pelletized sorbents. The loaded amines are introduced to the pelletized sorbent composition during manufacturing as a part of the polymer binder solution. The loaded amines are distributed throughout the pelletized sorbent and serve to increase final $CO_2$ sorption capacity. Loaded amines may be present in the pelletized sorbent up to about 8 wt % of the total pelletized sorbent. Other preferred additives include the following: (i) antioxidants such as sodium carbonate, sodium bicarbonate, potassium carbonate, other water-soluble metal-carbonates, phenylenediamine, and various aminoacids, (ii) $CO_2$ adsorption enhancers such as ethylene glycol, poly (ethylene glycol), and non-ionic surfactants. One or more of these additives may be incorporated within the pelletized sorbent's base constituents to promote characteristics such as porosity, stability, or $CO_2$ migration through the pellet and may also be incorporated within the binder solution.

Pelletized Sorbent Composition:

A salient aspect of the invention is the final pelletized sorbent composition. Key parameters are the sorbent capacity of the pelletized sorbent, primarily as a result of the loaded BIAS and additives, and the structural integrity of the pelletized sorbent, which is primarily a result of the inorganic strength additives and their interaction with the binding polymers. Pellet composition is calculated as total dry pelletized sorbent weight, where total dry pelletized sorbent weight includes the mass of the BIAS, inorganic strength additive, polymer binder, and any loaded amines.

The preferred pelletized sorbent composition range as follows: from about 63 to about 92 wt % as BIAS of total dry pelletized sorbent weight BIAS sorbent, from about 8 to about 37 dry weight % as fly ash of total dry pelletized sorbent weight, 2 to 13 dry wt % as polymer binder of total dry pelletized sorbent weight. In another embodiment, additives present in pelletized sorbents up to about 8 wt % as loaded amine of total dry pelletized sorbent weight.

The pelletized sorbents demonstrate high $CO_2$ capture capacity in wt % or mmol $CO_2$/g-pellet) relative to their total dry pelletized sorbent weight. As expected, an increasing wt % of inorganic strength additive with the corresponding decrease wt % of BIAS results in a decreasing $CO_2$ sorption. To illustrate, reduction in $CO_2$ capture capacity for fly ash/$EI_{423}$-S and fly ash/TEPA-S pellets with increased fly ash content resulted from the replacement of the amine sorbents with fly ash, which only captured 0.01 mmol $CO_2$ $g^{-1}$. The combination of strength and $CO_2$ capture for fly ash/$EI_{423}$-S (20/80)_$PVC_{62}$ and fly ash/TEPA-S (30/70)_$PVC_{62}$ summarized in Table 2 demonstrate the pelletized sorbents (especially the former) are attractive for long-term stability use.

TABLE 2

Performance and composition of optimized FA/$EI_{423}$-S and FA/TEPA-S (X/Y)_$PVC_{62}$ pellets. Values for pellets without FA and for the corresponding particle sorbents are included for comparison.

| Material | Binder content: $PVC_{62}$/FA/ TEPA(loaded) (wt %) | $CO_2$ capture (mmol $CO_2$ $g^{-1}$)] | Crush strength (MPa) |
|---|---|---|---|
| $EI_{423}$-S | (50 wt % $EI_{423}$/silica) | 2.90 | |
| TEPA-S | (50 wt % TEPA/silica) | 2.91 | |
| FA/$EI_{423}$-S (0)_$PVC_{62}$ | 10/0/5 | 1.79 | 1.07 |
| FA/TEPA-S (0)_$PVC_{62}$ | 10/0/5 | 1.51 | 0.46 |
| FA/$EI_{423}$-S (20/80)_$PVC_{62}$ | 10/17/5 | 1.33 | 1.42 |
| FA/TEPA-S (30/70)_$PVC_{62}$ | 10/25/5 | 1.10 | 1.13 |

Pelletized Sorbent Performance:

The pelletized sorbent $CO_2$ sorption capacity is primarily a function of the BIAS and any amine bearing additives, where as noted above the sorption capacity is the ability of the pelletized sorbent to adsorb and separate an amount of $CO_2$ from a gaseous mixture. The sorption capacity of the pelletized sorbents is typically greater than 1.0 mmol/g. Preferentially, the sorption capacity of the pelletized sorbents is greater than 1.7 mmol/g. More preferentially, the sorption capacity of the pelletized sorbents is greater than 2.0 mmol/g. FIGS. 2, 8, 10, and 11 show the $CO_2$ capture capacities (mmol $CO_2$/g) of different pelletized sorbents comprised of various BIAS and polymer binders, and also containing a range of fly ash content (wt %).

Another salient aspect of the invention is that the pelletized sorbent is hydrophobic in that it repels $H_2O$ vapor or condensed $H_2O$ (liquid $H_2O$), thus preserving the $CO_2$ capture capability of the pellet. As noted previously, a disadvantage of the current stand-alone BIAS is that they are vulnerable to leaching from the sorbent pores by condensed steam during practical $CO_2$ adsorption-desorption testing under humidified conditions. However, the negative effect of steam in the gaseous mixture is remedied by the incorporation of the hydrophobic polymer binder to the BIAS in the pelletized sorbent. The hydrophobic polymer binder minimizes contact between the pelletized sorbent's amines and condensed steam during $CO_2$ capture cycling under practical humid conditions. This hydrophobicity extends the lifetime of the pelletized sorbent. To achieve a hydrophobic pelletized sorbent, the selected BIAS may be hydrophobic when the polymer binder is hydrophilic.

In one test, the $CO_2$ capture capacity of the pelletized sorbent $FA/EI_{423}$-S (20/80)_$PVC_{62}$ after being exposed to 0.5 mL/min of flowing water for 40 min (a published accelerated $H_2O$ testing method) was 71% of that for the fresh sorbent, where the PCR value used to assess pellet hydrophobicity is calculated by dividing the pellet or particle sorbent $CO_2$ capture capacity after accelerated $H_2O$ testing by the capacity of the fresh materials and multiplying by 100. This high percentage of accelerated $H_2O$ $CO_2$ capture retained (further described as PCR unless otherwise noted) value for the pellet, compared to only ~3% for the $EI_{423}$-S particle sorbent, shows that PVC served as a hydrophobic pellet binder. It was shown in the literature that there is a direct correlation between the accelerated $H_2O$ PCR values and the stabilities of BIAS material to $H_2O$ vapor during practical steam testing at high temperatures (55-105° C.) for 10-30 hr. These temperatures are in the range of those encountered during practical $CO_2$ adsorption-desorption cycle testing. The reduced $CO_2$ capture of the pelletized sorbent after accelerated $H_2O$ testing is a result of amine leaching from the BIAS material and likely rearrangement of the amines within the sorbent structure. These degradation mechanisms are also encountered during practical testing under steam conditions. Typical pelletized sorbents exhibit a PCR value of greater than about 20%. In a preferred embodiment, the pelletized sorbents exhibit a PCR of greater than 50%. More preferred pelletized sorbents exhibit a PCR of greater than 60%.

Another salient point of the disclosed pelletized sorbent is the structural integrity of the pellet. The pelletized sorbent may have a crush pressure ($P_{crush}$) of 0.2 to 6 MPa, where crush pressure is defined as ($P_{crush}=F_{weight}/(D_{pellet}*L_{pellet})$, where $F_{weight}$ the crush force, $D_{pellet}$=pellet diameter and $L_{pellet}$=pellet length, as measured by micro-calipers. The calipers have a precision of 0.01 mm. In one embodiment, the pelletized sorbents have a $P_{crush}$ greater than 0.3 MPa. Preferentially, the pelletized sorbents have a $P_{crush}$ greater than 1.0 MPa. More preferentially, the pelletized sorbents have a $P_{crush}$ greater than 1.3 MPa.

Preferred pelletized sorbents comprised of the BIAS, inorganic strength additive and polymer binder possess a $CO_2$ capture of greater than 1.7 mmol $CO_2$/g, a PCR greater than 50%, and a $P_{crush}$ greater than about 1.0 MPa. More preferred, the hydrophobic pelletized sorbents possess a $CO_2$ capture of greater than 2.0 mmol $CO_2$/g, a PCR value greater than 50%, and a $P_{crush}$ greater than about 1.3 MPa.

Three exemplary methods of formation of pelletized sorbents are disclosed. These methods involve (i) impregnating liquid amines into already fabricated pellets comprising the inorganic strength additive and polymer binder (ii), mechanically compressing BIAS/inorganic strength additive/polymer binder mixtures, and (iii) shaping wet pastes comprised of amine sorbent/inorganic strength additive/polymer binder solution into pellets by extrusion or mold-casting.

In performing one example of method (i), a support structure for the pellet would be first prepared by combining a ground silica support and strength additive powder, primarily fly ash, with a polymer binder solution containing 5 to 10 wt % polymer binder (primarily poly (vinyl chloride) or poly (chloroprene)) and potentially a dispersant or pore former to facilitate porosity throughout the polymer binder for $CO_2$ transport through the pellet. The resulting pastes would be extruded into ropes, and the resulting dry rods would be dried at 25 to 105° C. It can be inferred that the —Cl groups of the chlorinated polymer binder would interact with silica and any binder additives to adhere the particles. Once dried, these pellet supports would be mixed with an impregnation solution containing amine species typical of the BIAS sorbents, such as TEPA and PEI as previously mentioned, and a solvent. The final composition of the dry pellets would be 5-15 wt % polymer binder plus dispersant/pore former, 8-20 wt % strength additive, and the balance of silica plus impregnated amines; amine/silica weight ratios would be between 1/3 and 1/1.

Pelletization of BIAS sorbents by method (ii) would be accomplished by first preparing dry mixtures containing BIAS sorbent, strength additive (namely fly ash), and the polymer binder in fine powder or particle form The dry mixtures would be placed into a cylindrical or other-shaped mold at 25° C. or at elevated temperature and compressed between 1,000 and less than 5,000 psig to form the resulting hydrophobic pellets. It is expected that Class 1 sorbents (polyamine/silica), as previously described, would form stronger pellets than those of Class 2 sorbents (aminosilane/silica), due to even distribution of the higher-viscosity polyamines within the pellet. The polyamines would presumably exists largely inside the sorbent and pellet pores, and allow the pellet to resist compression due to capillary forces among the amine-silica-strength additive-polymer binder network and also the Class 1 amine's high viscosity.

Although more complex than method (ii), pelletization of sorbents by method (iii) is attractive for large scale processes because of the ability to maintain continuous extrusion and formation of sorbent dry component/polymer pastes into pellets. Therefore, this method is primarily used to prepare the polymer binder/fly ash/BIAS pellets and is further illustrated in FIG. 5.

Figure 5:
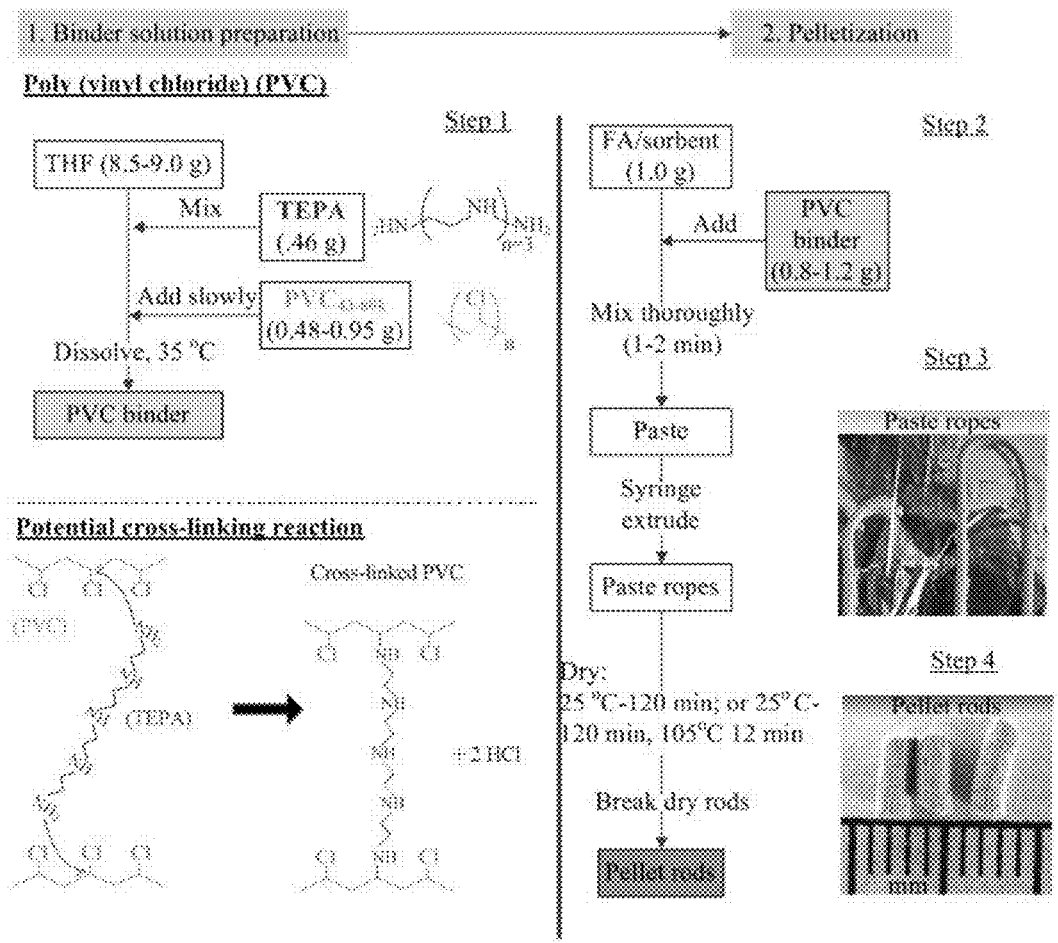
FIG. 5: Illustrates an exemplary preparation procedure of a pelletized sorbent comprising BIAS/fly-ash/PVC.

FIG. 5 shows an exemplary procedure for pelletizing the different BIAS sorbents with a poly (vinyl chloride) polymer binder according to method (iii). Step 1 involves preparing the binder solution with different concentrations (5-10 wt %) of $PVC_x$ (x=Mw: 43 k, 62 k, or 80 k) and TEPA (0-5 wt %)

dissolved in tetrahydrofuran (THF). In step 2, 1.0 g of the ground sorbents was mixed with FA at FA/sorbent weight ratios from 0/100 to 100/0. A 0.8-1.2 g amount of each binder solution was added to 1.0 g of the FA/sorbent mixtures to form pastes, which were extruded into ropes in step 3. In step 4, the wet ropes were either dried at 25° C. for 120 min or dried at 25° C. for 60 min followed by 105° C. for 12 min, and broke into cylindrical pellets (D~1.4-1.2 mm, L~5 mm). A potential cross-linking reaction between the amine (TEPA shown) and PVC would join the polymer chains and enhance the mechanical strength of the pellet.

EXAMPLES

Example 1: Poly (Vinyl Chloride) (PVC) Binder

Pellet Preparation

Pelletization of sorbents was accomplished by first grinding the 100 µm size particle BIAS into ≤25 µm size powders, which was verified by both optical microscope and particle size distribution analysis via dynamic light scattering. The powder sorbents were homogeneously mixed with Class F fly ash (FA) powder (FA, $D_{P,avg}$=1.7 µm) at 0/100-100/0 FA/sorbent weight ratios. Poly (vinyl chloride) (PVC)-based polymer binder solutions were prepared by dissolving different molecular weights of the hydrophobic polymer (Mw=43,000 g gmol$^{-1}$, $PVC_{43}$; Mw=62,000 g gmol$^{-1}$, $PVC_{62}$; Mw=80,000 g gmol$^{-1}$, $PVC_{80}$, Sigma-Aldrich) (0.5 g) into tetrahydrofuran (THF, anhydrous, Sigma-Aldrich) (4.25 g) at 50° C. followed by adding TEPA as a loaded amine (0.25 g) to the PVC/THF mixture. TEPA provides amines sites for both $CO_2$ adsorption and inter-particle $CO_2$ diffusion through the pellet. Multiple 1.2 g amounts of the binder solution were mixed with 1.0 g portions of each FA/sorbent mixture in a fume hood to form pastes. Rapid evaporation of THF while mixing resulted in a wet binder/dry powder ratio of 0.7/1.0 for the pastes, which were syringe-extruded into ~1.6 mm diameter ropes. The ropes were dried at 25° C. for 3 hr and then at 105° C. for 12 min, producing dry pellet rods that were broken into ~3-6 mm lengths. The dry pellets contained about 10 wt % PVC, 0-34 wt % FA, 5 wt % TEPA (from binder soln.), and 51-85 wt % of the amine/silica BIAS sorbent. The pellets were named with the scheme, FA/Sorbent (X/Y)_Polymer, where X/Y (Y=100−X) are the wt % of FA/sorbent in the dry powder (FA plus sorbent) and Polymer is 10 wt % as the polymer binder.

Pellet Performance

Results for $CO_2$ capture capacities and crush strengths of the PVC-based pellets containing various fly ash contents was previously discussed and can be seen in FIG. 2. A preferred PVC-based pellet, FA/$EI_{423}$-S (20/80)_$PVC_{62}$, contained about 17 wt % fly ash and about 10 wt % PVC, and captured 1.33 mmol $CO_2$/g and had as crush strength of 1.42 MPa. The higher mechanical strengths for the $EI_{423}$-S pellets than for the TEPA-S pellets are attributed to the higher viscosity of the $EI_{423}$ amine than that of TEPA. The higher viscosity creates a strong resistance to the compressive forces during crush testing.

Example 2: p-Phenylenediamine (PPD)-Modified PVC Binder

Pellet Preparation

In step 1, 1.0 g of PVC (Mw=62,000) was dissolved in 15.0 g of tetrahydrofuran (THF) on a hotplate at 45° C. followed by the addition of p-phenylenediamine (PPD) to the PVC/THF mixture. Four different mixtures were prepared by varying the amount of PPD to give —$NH_2$ (PPD)/—CHCl(PVC) molar ratios of 0.5, 0.6, 1.0, and 2.0. The resulting PVC/PPD/THF mixtures were reacted at 45° C. for 1-1.5 hr, which formed dark red/brown semi-viscous solutions. Step 2 involved adding the viscous solutions to 200 mL of ethanol (EtOH) under mixing, which precipitated light-pink PPD-modified PVC. In step 3 the precipitates were filtered, and then twice washed with EtOH and filtered. Lastly in step 4, the cleaned PPD-modified PVC materials were air dried overnight (17 hr) and then oven dried at 105° C. for 12 min to remove the remaining EtOH. Pellets containing the PPD-modified PVC were prepared using a similar procedure as that for the PVC pellets. Multiple 1.2 g amounts of solutions containing 10 wt % PPD-modified PVC/5 wt % TEPA/THF were mixed with separate 1.0 g portions of the FA/$EI_{423}$-S (20/80) dry mixture to form the pastes, which were extruded and dried to give the final cylindrical pellets.

Pellet Performance

Figure 6:
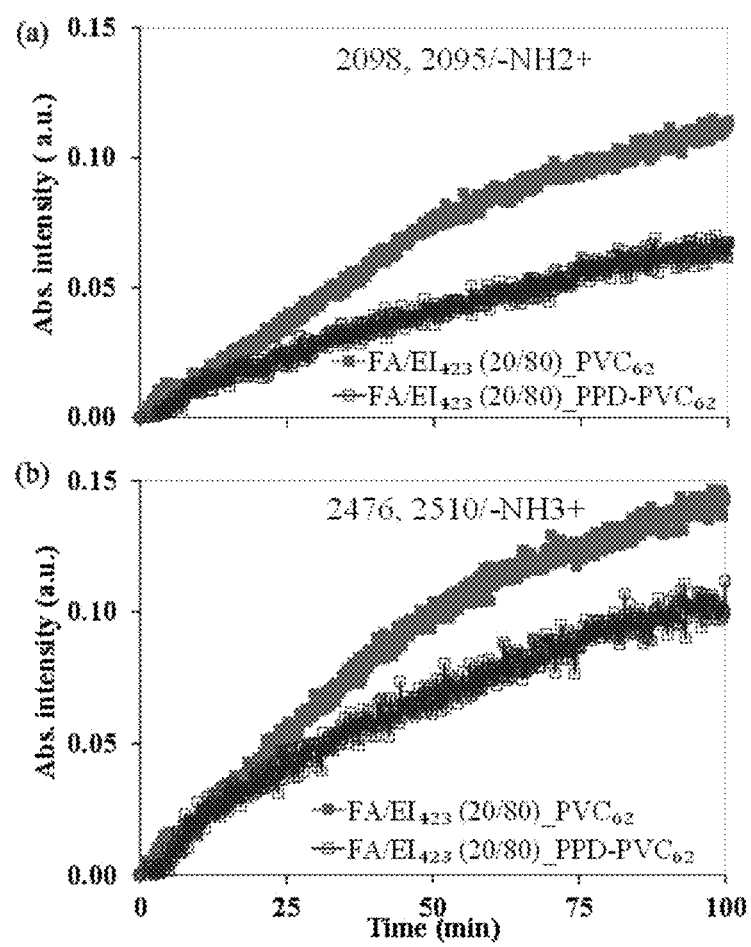
FIG. 6. Illustrates IR absorbance intensity profiles for (a) $—NH_2^+$ and (b) $—NH_3^+$ species generated during in situ degradation at 105° C. under $N_2$ flow for $FA/EI_{423}$ (20/80) based pelletized sorbents having $PVC_{62}$ and $PPD-PVC_{62}$ binders.

Results showed that the pellet prepared from the 0.6 molar ratio —$NH_2$ (PPD)/—CHCl ($PVC_{62}$), labeled as FA/$EI_{423}$-S (20/80)_PPD-$PVC_{62}$, captured 1.51 mmol $CO_2$/g and had a crush strength of 1.32 MPa. Furthermore, diffuse reflectance infrared Fourier transform spectroscopy (DRIFTS) revealed that the PPD-PVC binder produced a pellet less prone to forming ammonium ions (—$NH_2^+$, —$NH_3^+$) than the pellet prepared from PVC. FIG. 6 shows a slower increases in both the —$NH_3^+$ species (2476, 2510 cm$^{-1}$) and the —$NH_2^+$ (2098, 2095 cm$^{-1}$) for the PPD-PVC-based pellet than the PVC-based pellet, which confirms the better stability of the former. Furthermore, the higher $CO_2$ capacity for this pellet indicates that amine groups of the PPD-PVC played a role in $CO_2$ capture or diffusion through the pellet.

Example 3: Poly (Chloroprene) (PC) Binder

Pellet Preparation

Figure 7:
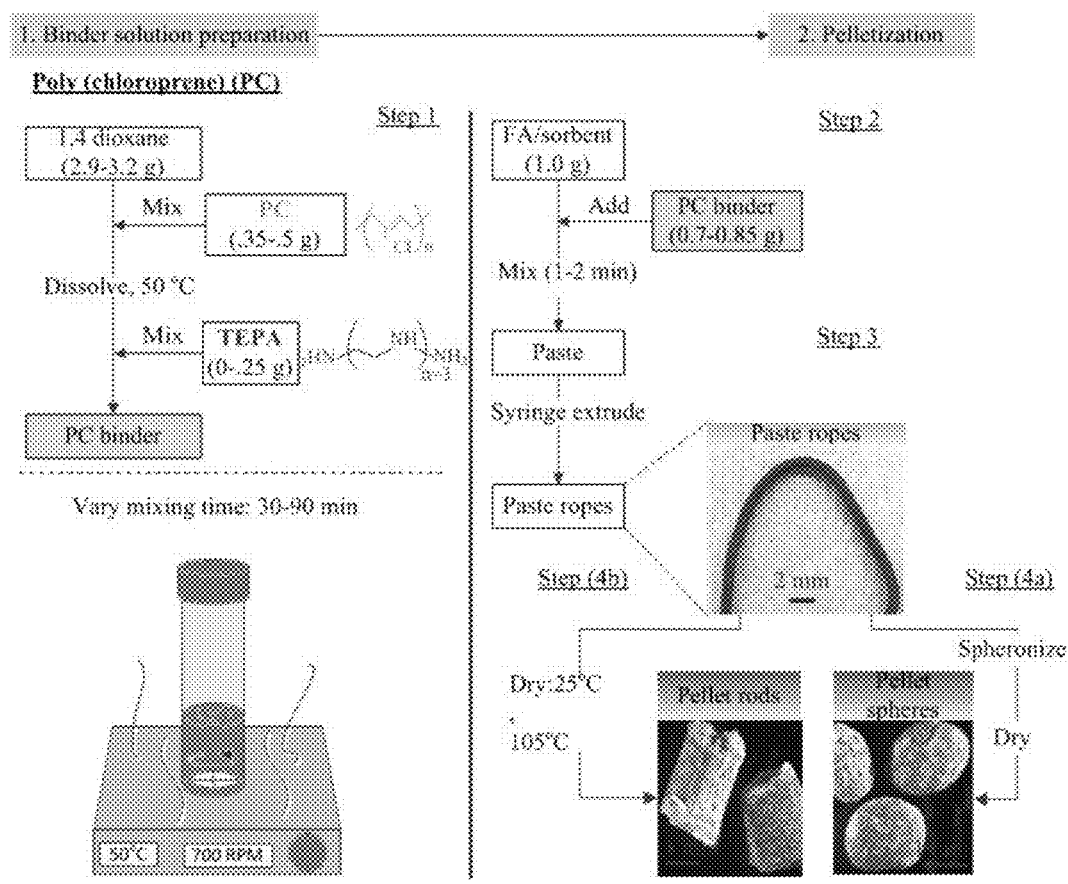
FIG. 7. Illustrates an exemplary preparation procedure for pelletized sorbents comprising BIAS/fly-ash/PC.

In one exemplary procedure, the ground $EI_{423}$-S sorbent ($D_p$<25 µm) was mixed with fly ash (FA) at FA/sorbent ratios of 10/90 and 20/80 to form the dry mixtures. FIG. 7 shows that pelletization of the dry mixtures with a poly (chloroprene) polymer binder (PC) (Sigma-Aldrich, Mooney viscosity=40) was accomplished in four steps. Step 1 the binder solution was prepared by mixing 0.48 g of PC in 3.15 g of 1,4-dioxane on a hotplate set at 50° C. for 30-90 min to form a viscous solution or low viscosity gel, and then adding TEPA if necessary. In step 2, 0.7-0.85 g of the PC binder solution was mixed with 1.0 g of each FA/sorbent dry mixture to form pastes, which were extruded into ropes in step 3. In step 4, the wet ropes were either (b) spheronized or (a) not spheronized and then dried at 25° C. for 60 min followed by 105° C. for 60 min. The resulting dry rods (not spheronized) were broke into cylindrical pellets (D~1.7 mm, L~5 mm).

In another exemplary procedure, pelletization of dry mixtures of FA and ground 50 wt % ethylenimine E100 (Huntsman)/silica (E100-S), FA/E100-S=20/80 and 10/90 with the poly (chloroprene) polymer binder (PC) (Sigma-Aldrich, Mooney viscosity=40) was accomplished in four steps. Step 1 was preparing 4.0 g batches of different binder solutions containing 10-13 wt % PC dissolved in 1,4-dioxane for 20-90 min using an oil bath at 105° C. Depending upon the dissolving time, different binder solution consistencies were obtained and ranged from thick viscous gels to medium viscosity solutions. In step 2, 1.1 g of each PC solution was mixed with 1.0 g amounts of the FA/sorbent dry mixture to form a wet or putty-like paste, which was extruded into ropes in step 3. In step 4, the ropes were dried at room temperature for 1 hr then dried at 105° C. for 1 hr. The final pellets contained 8-18 wt % FA, 10-13 wt % PC, and the balance of sorbent. The pellets were simply labeled according to their nominal PC wt % and mixing time.

Pellet Performance

Table 3 shows the performance of the FA/EI$_{423}$-S/PC pellets prepared with similar wt % of poly (chloroprene) polymer binder, where the corresponding PC/dioxane binder solutions were mixed at 50° C. for different times. The binder solutions of these pellets do not have TEPA.

TABLE 3

$CO_2$ capture capacity and mechanical strength of pellets prepared with nominal compositions of 70-75 wt % of 50 wt % EI$_{423}$/silica BIAS sorbent 7-9 wt % poly (chloroprene) (PC), and 8-19 wt % fly ash (FA). Crush strength was determined as the point of complete pellet crushing or at ~50% pellet compression.

| Pellet | Binder mix time (min) | PC/FA (wt %) | Initial $CO_2$ ads. (mmol $CO_2$/g) | Crush pressure (MPa) |
|---|---|---|---|---|
| P1 | 90 | 9.1/18.2 | 1.44 | 0.91 (flexible) |
| P2 | 40-55 | 8.5/18.3 | 1.65 | 1.20 |
| P3 | 40-55 | 7.2/18.6 | 1.67 | 1.08 |
| P4 | 30 | 8.7/18.3 | 1.37 | 1.57 (rigid) |
| P5 | 30 | 8.4/9.2 | 1.61 | 1.12 |

All pellets prepared with PC exhibited $CO_2$ capture capacity between 1.4 and 1.7 mmol $CO_2$/g and varying crush strengths, which depended upon the binder mixing time and fly ash content. Pellets 1-4 show that decreasing the mixing time enhanced the crush strength from 0.91 to 1.57 MPa.

Figure 8:
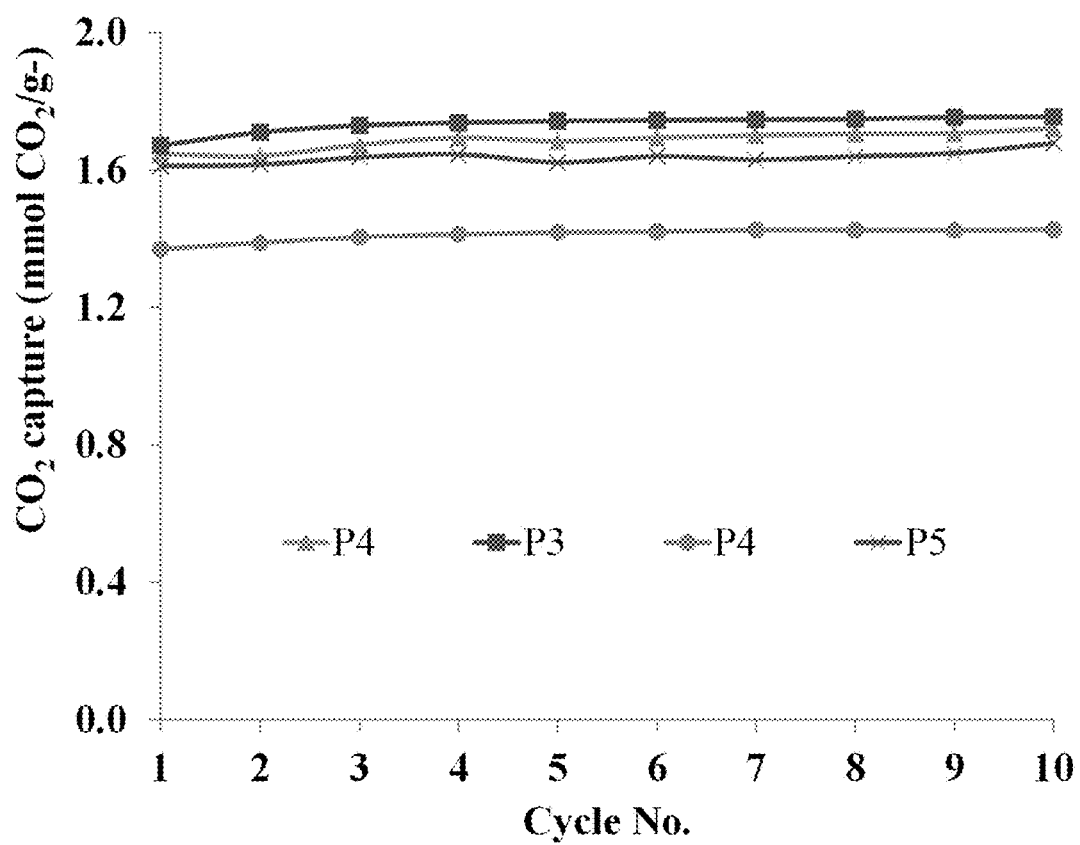
FIG. 8: Illustrates the cyclic $CO_2$ capture capacities of a pelletized sorbent comprising $EI_{423}$/fly-ash/PC.

FIG. 8 shows the $CO_2$ capture capacities of the P2-P5 pellets BIAS sorbent during 10 $CO_2$ adsorption-desorption cycles. Cycles were performed in a thermogravimetric analyzer (TGA) by (i) pretreating at 105° C. for 10 min in 60 mL/min flowing $N_2$, (ii) flowing 60 mL/min of 14% $CO_2$/N for 10 min at 55° C. for $CO_2$ adsorption, (iii) switching the flow to 60 mL/min $N_2$ for 10 min for pressure swing $CO_2$ desorption, and (iii) heating at 105° C. for 10 min in the $N_2$ flow for combined temperature and pressure swing $CO_2$ desorption. All pellets exhibited stable $CO_2$ capture capacities during the 10 adsorption-desorption cycles, showing promise for the application of FA/BIAS/poly (chloroprene) pellets to large scale processes.

Figure 9:
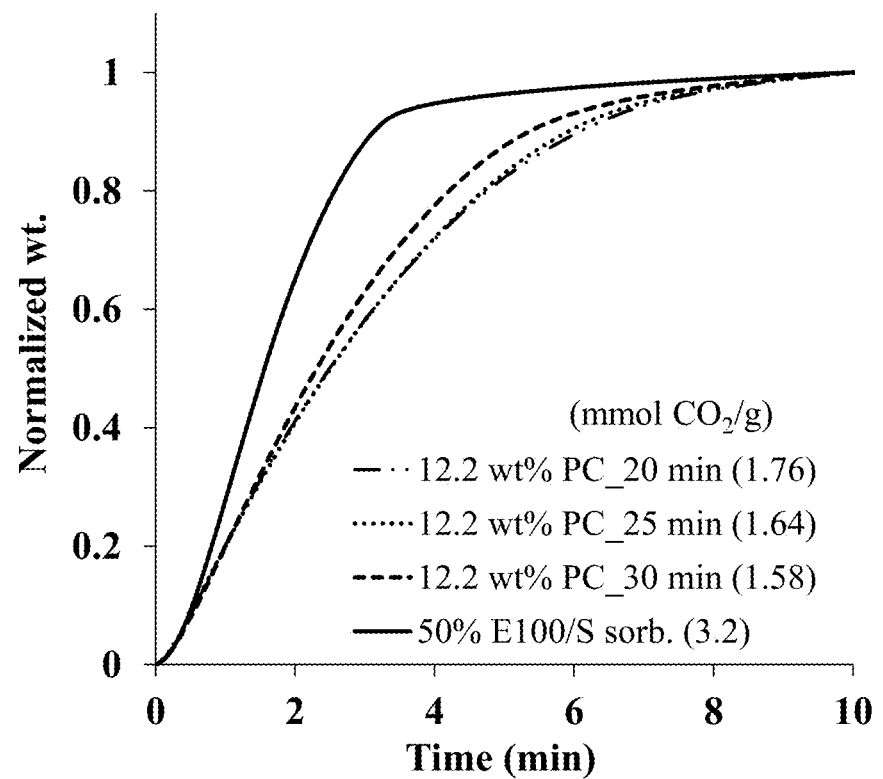
FIG. 9. Illustrates $CO_2$ adsorption of a pelletized sorbent comprising 12.2 wt % PC prepared from binder solutions having different mixing times and of the fresh particle E100/S sorbent.
Figure 10:
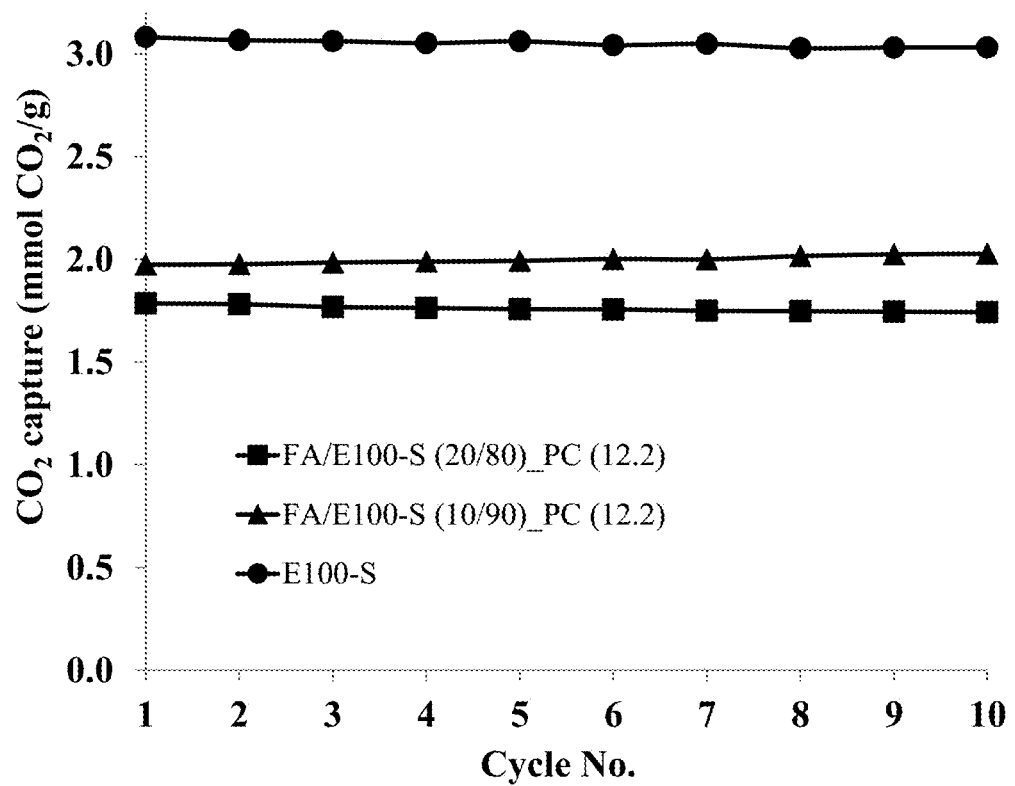
FIG. 10. Illustrates the cyclic $CO_2$ capture capacities of a pelletized sorbent comprising E100-S/fly-ash/PC.

Pellets prepared with the FA/E100-S dry mixtures and different amounts of PC, where PC was dissolved in the binder solutions for 20-30 min, exhibited different physical characteristics and $CO_2$ uptake kinetics and capacities. The pellets prepared from FA/E100-S (20/80) dry mixtures contained between 11 and 13 wt % PC, with an optimum of 12.2 wt % PC. FIG. 9 reveals that dissolving the PC for different times produced slight but noticeable changes in the pellet $CO_2$ uptake kinetics and final $CO_2$ capture capacities. One preferred pellet was prepared with a binder solution mixing time of 20 min, and was labeled "12.2 wt % PC_20 min" in FIG. 9. This pellet contained about 17 wt % fly ash, 12.2 wt % PC, and the balance of the FA/E100-S dry mixture and captured 1.76 mmol $CO_2$/g. Given the optimum PC content for the 17 wt % fly ash pellet, a pellet was prepared with lower fly ash content, about 8 wt % fly ash, 12.2 wt % PC, and the balance of E100-S, and was labeled FA/E100-S (10/90)_PC (12.2). Similar to the EI$_{423}$-S based pellets, the FA/E100-S (20/80)_PC (12.2) pellets underwent cyclic $CO_2$ capture studies in the TGA system. The results of the cyclic study, shown in FIG. 10, reveal that the FA/E100-S (20/80)_PC (12.2) and FA/E100-S (10/90)_PC (12.2) pellets exhibited highly stable $CO_2$ capture capacities of around 1.76 (2.4% $CO_2$ capture decrease from 1.79 to 1.74 mmol $CO_2$/g) and 1.98 (2.7% increase from 1.97 to 2.04 mmol $CO_2$/g) under dry conditions. Furthermore, accelerated $H_2O$ PCR values for FA/E100-S (20/80)_PC (12.2) and FA/E100-S (10/90)_PC (12.2) were 55.5% and 57.3% respectively, compared to 3% for the E100-S sorbent, confirming that poly (chloroprene) served as a hydrophobic polymer binder. These data indicate that the pellets will have stable performances during cycling in the presence of $H_2O$ vapor.

Cyclic testing of the FA/E100-S (20/80)_PC (12.2) pellet under practical, humid conditions was accomplished by placing 0.85 g of pellets into a ¼" diameter fixed bed reactor; pre-treating the pellets at 105° C. in 100 mL/min flowing He for 20 min; switching the flow from He to either 10% $CO_2$/He (dry cycles) or $CO_2$/He/~5% $H_2O$ (wet cycles) for 20-25 min for $CO_2$ adsorption; switching the flow back to He for removal of weakly adsorbed $CO_2$ by pressure swing for 12-15 min; and then heating to 105° C. and holding at 105° C. for 20-25 min for combined temperature/pressure swing desorption of strongly adsorbed $CO_2$. $CO_2$ capture capacity and fixed bed reactor steam PCR (steam PCR) value of the pellets were calculated from the effluent $CO_2$ gas concentration during the $CO_2$ adsorption step of the two dry cycles before and after the wet cycles. Gas profiles were measured by a mass spectrometer located after the reactor. The 7 total cycles took 13 hr, with 6 hr exposure of the pellets to a humid environment. Results showed that the $CO_2$ capture capacity of the pellet decreased by only 4% steam PCR=96%), from 1.74 mmol to 1.67 mmol $CO_2$/g, after testing and confirms the robust nature of the combination of FA, PC, and BIAS to produce a strong, stable, and hydrophobic pellet.

The FA/PC/BIAS pellets exhibited good flexibility, so attrition testing of the pellet was performed instead of crush testing to assess pellet mechanical strength. The attrition test was modified from two ASTM standards, E728-91 and D4058-96. For the test here, 2.0 g of pellets and 20 g of ³⁄₁₆' metal ball bearings (about 46 ball bearing) were placed inside of a glass jar (diameter=7.3 cm, length=9.1 cm) containing a 0.5" protruding baffle along the full length of the jar. The jar and its contents were rotated at about 39-40 rpm for a period of 24 hours, and the attrition of the pellets was calculated by measuring the weights of both fine particles broken away (attritted) and the remaining intact pellets. Results showed that the pellets attritted less than 0.5% after the 24 hr, indicating that the pellets could remain intact during $CO_2$ adsorption-desorption cycling in a moving bed reactor system. The 0.5% attrition is significantly less than the ~17% and 81.5% attrition observed for some commercially available silica pellets after only 1 hr, which confirms the superior strength of the PC/fly ash combination over currently available materials.

Example 4: Polyurethane (PU) Binder

Sorbent EI$_{423}$-S was ground to <25 μm (optical microscope) and mixed with fly ash (FA) at a FA/sorbent ratio of 20/80 to form the dry mixture. Five binder solutions were prepared by mixing 1.3 g of different polyurethane (PU) dispersion solutions (40 wt % PU/$H_2O$, Bayer) with 6.6 g $H_2O$ and then adding 0.22 g tetraethylenepentamine (TEPA, technical grade). The five PU binder solutions were prepared with Bahydrol 124 (anionic dispersion, aliphatic polycarbonate urethane), Bahydrol 140 AQ (anionic dispersion, aliphatic polyester urethane), Bayhydrol XP 2637 (anionic dispersion, aliphatic polycarbonate urethane), Bayhydrol UH XP 2719 (anionic dispersion, aliphatic polyester-based), and Baybond PU 406 (non-ionic polyurethane). A 0.9 g amount of each binder solution was mixed with 1.0 g of the dry sorbent/FA mixture, and the resulting paste was extruded into 1.5-2.0 mm diameter wet ropes. The wet ropes were dried at 100° C. for 60 min to form the 1.5-2.0 mm diameter pellets, which were broken into 3-6 mm lengths. Table 4 shows that pellets prepared with polyurethane as a hydrophobic polymer displayed modest $CO_2$ capture and acceptable crush strength. These data show that although PU can also serve as a polymer binder for polymer/FA/BIAS pellets.

TABLE 4

$CO_2$ capture capacities of pellets prepared with different polyurethanes as either a hydrophobic polymer binder, or hydrophobic BIAS additive.

| Pellet | Solid polymer | Solid polymer (wt %) | Fly ash (wt %) | $CO_2$ capture mmol $CO_2$/ g-pellet. | Crush pressure (MPa) |
|---|---|---|---|---|---|
| P1 | Bayhydrol PU 2719 | 12.3% | 8.6% | 1.15 | 0.61 |
| P2 | Bayhydrol PU 2719 | 8.1% | 9.1% | 1.22 | 0.51 |
| P3 | Baybond PU 406 | 7.8% | 9.1% | | 0.37 |
| P4 | Bayhydrol 140 AQ | 8.1% | 9.1% | 1.12 | <0.13* |
| P5 | Bayhydrol 124 | 7.5% | 9.1% | 1.33 | <0.13* |
| P6 | Bayhydrol XP 2637 | 7.7% | 9.1% | 1.22 | <0.13* |
| P7 | Cross-linked PVA (Mw = 89,000) | 5.1% | 18.6% | 0.89 | 1.47 |

*Minimum crush pressure that can be applied by the bench-top tester. The actual crush pressure is less.

Example 5: Polyurethane Additive to Amine/Silica BIAS Sorbent, with a Cross-Linked Poly (Vinyl Alcohol) Binder Polyurethane UH XP 2719 was also used as an additive to produce a hydrophobic sorbent that could be pelletized with poly (vinyl alcohol) (PVA), which is a hydrophilic polymer binder. A sorbent consisting of $PEI_{800}$/Bayhydrol UH XP 2719/silica-36/4/60 by weight, labeled NETL 96D, was prepared using the previously described wet impregnation method. The polymer binder solution was prepared by combining two solutions. Solution 1 contained 0.25 g polyethylenimine MW=2,000 ($PEI_{2000}$, Aldrich) dissolved in 2.22 g $H_2O$. Solution 2 contained 0.26 g PVA Mw=89,000 ($PVA_{89k}$, Aldrich) and 0.09 g of a 25 wt % glutaraldehyde (GA) solution (Aldrich) dissolved in 2.22 g $H_2O$. Solution 2 was heated at 80° C. for 30 min to pre-cross-link PVA and glutaraldehyde. Glutaraldehyde is a dialdehyde that can join PVA-PVA chains via C—O—C linkages, and also join PEI-PEI and PVA-PEI polymer chains, all which contribute to the pellet strength. Solutions 1 and 2 were combined to form the total binder solution, where 0.65 g of the solution was mixed with 1.0 g of a FA/NETL 96D-20/80 dry mixture to form a paste. The paste was extruded into 1.5-1.9 mm diameter ropes, which were dried at 105° C. for 60 min and broke into 3-6 mm lengths to form the final pellets. The $CO_2$ capture of the pelletized FA/sorbent mixture was a low 0.89 mmol $CO_2$/g, while exhibiting a crush strength comparable to PVC and PC (Table 4). These data show that pelletization of FA/BIAS combinations can involve either a hydrophobic polymer binder, such as PVC or PC, when the BIAS is hydrophilic or a hydrophilic polymer binder, such as PVA, when the BIAS contains a hydrophobic BIAS additive, such as polyurethane.

Example 6 Additional Polymer Binders

Figure 11:
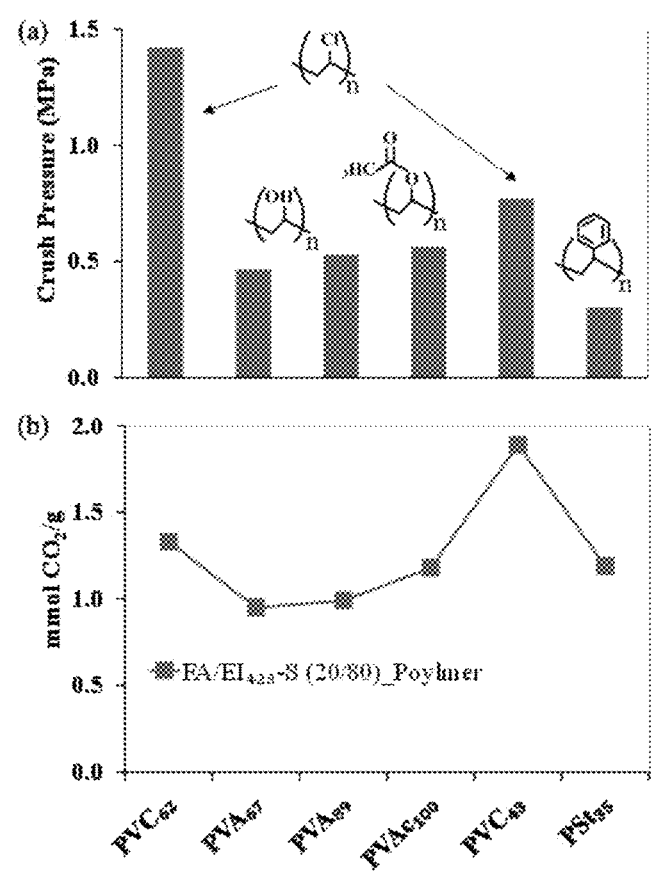
FIG. 11. Illustrates the effect of different polymer binders on the $CO_2$ capture capacity and structural integrity

The $FA/EI_{423}$-S (20/80) dry powder was also pelletized with 10 wt % of non-cross-linked poly (vinyl alcohol) [$PVA_{67}$ (Mowiol 8-88) and $PVA_{89-98}$], polystyrene ($PSt_{35}$), and poly (vinyl acetate) ($PVAc_{100}$), along with 5 wt % TEPA both on a dry pellet basis. A similar procedure as that for the PVC-based pellets was used to prepare pellets with these additional polymer binders. These polymer binders illustrate the versatility of the pelletized sorbents using a variety polymer binders with different properties and hydrophobicity/hydrophilicity. About 1-1.2 g of each polymer binder solution containing 10 wt % of PVA ($H_2O$ solvent), PSt (THF solvent), or PVAc (EtOH solvent) and 5 wt % TEPA was mixed with 1.0 g of the $FA/EI_{423}$-S (20/80) dry mixture, extruded, and then dried to form the final pellets. The pelletized sorbent performance is illustrated in FIG. 11.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

We claim:

1. A pelletized sorbent for separation of $CO_2$ from a gaseous mixture, said pelletized sorbent comprising:
    a first component comprising a Basic Immobilized Amine Sorbent;
    a second component comprising fly ash; and
    a third component comprising a polymer binder,
    wherein the Basic Immobilized Amine Sorbent and fly ash are interconnected by the polymer binder.

2. The pelletized sorbent of claim 1 wherein the Basic Immobilized Amine Sorbent is present in the range from about 63% to about 92% of the total dry pelletized sorbent weight.

3. The pelletized sorbent of claim 1 wherein the polymer binder is selected from the group consisting of poly(vinyl chloride), poly(chloroprene), poly(vinyl alcohol), poly(vinyl acetate), and polystyrene.

4. The pelletized sorbent of claim 3 wherein the polymer binder is poly(vinyl chloride) or poly(chloroprene).

5. The pelletized sorbent of claim 1 wherein the pelletized sorbent is hydrophobic.

6. The pelletized sorbent of claim 1 further comprising:
    a fourth component comprising a cross-linker having at least two functional groups, wherein the at least two functional groups are bound to the polymer binder.

7. The pelletized sorbent of claim 6 wherein the at least two functional groups are selected from the group consisting of aldehyde, amine, carboxylic acid, epoxy, aminosilane, alkoxysilane, cyanate, isocyanate, acrylate, cyanoacrylate, and combinations thereof.

8. The pelletized sorbent of claim 7 wherein the cross-linker is a polyamine.

9. The pelletized sorbent of claim 1 further comprising:
a crush strength equal to or greater than about 0.3 MPa.

10. The pelletized sorbent of claim 9 wherein the crush strength is equal to or greater than about 1.3 MPa.

11. The pelletized sorbent of claim 1 further comprising:
a $CO_2$ sorbent capacity equal to or greater than about 1.0 mmol/g.

12. The pelletized sorbent of claim 11 wherein the $CO_2$ sorbent capacity is equal to or greater than about 2.0 mmol/g.

13. The pelletized sorbent of claim 1 further comprising:
a percentage of $CO_2$ capture retained (PCR) value equal to or greater than about 20%.

14. The pelletized sorbent of claim 13 wherein the PCR value is equal to or greater than about 50%.

15. The pelletized sorbent of claim 1 further comprising:
a $CO_2$ sorbent capacity equal to or greater than about 1.7 mmol/g; and
a percentage of $CO_2$ capture retained (PCR) value greater than 20%.

16. The pelletized sorbent of claim 1 further comprising:
a $CO_2$ sorbent capacity greater than 2.0 mmol/g; and
a percentage of $CO_2$ capture retained (PCR) value greater than 50%.

17. A pelletized sorbent for separation of $CO_2$ from a gas mixture, said pelletized sorbent comprising:
a first component comprising Basic Immobilized Amine Sorbent (BIAS),
wherein the Basic Immobilized Amine Sorbent is a Class 1, Class 2, or hybrid Class 1/Class 2 BIAS, and
wherein the Basic Immobilized Amine Sorbent is present in the range from about 68% to about 85% of the total dry pelletized sorbent weight;
a second component comprising inorganic strength additive, wherein the inorganic strength additive is fly ash,
wherein the inorganic strength additive is present in the range from about 5% to about 37% of the total dry pelletized sorbent weight; and
a third component comprising a polymer binder,
wherein the Basic Immobilized Amine Sorbent and the inorganic strength additive are interconnected by the polymer binder; and wherein the pelletized sorbent exhibits
a $CO_2$ sorbent capacity greater than 1.7 mmol/g;
a crush strength equal to or greater than 1.0 MPa or attrition value less than 1% after 24 hrs; and
a (PCR) value greater than 50%.

18. The pelletized sorbent of claim 17 wherein the polymer binder is hydrophobic.

19. The pelletized sorbent of claim 18 further comprising:
a fourth component comprising a cross-linker having at least two functional groups.

20. The pelletized sorbent of claim 19 where the cross-linker is a polyamine.

21. A pelletized sorbent for separation of $CO_2$ from a gaseous mixture, said pelletized sorbent comprising:
a first component comprising a Basic Immobilized Amine Sorbent;
a second component comprising an inorganic strength additive; and
a third component comprising a polymer binder comprising poly(vinyl chloride) or poly(chloroprene),
wherein the Basic Immobilized Amine Sorbent and inorganic strength additive are interconnected by the polymer binder.

22. A pelletized sorbent for separation of $CO_2$ from a gaseous mixture, said pelletized sorbent comprising:
a first component comprising a Basic Immobilized Amine Sorbent;
a second component comprising an inorganic strength additive; and
a third component comprising a polymer binder; and
a fourth component comprising a cross-linker having at least two functional groups, wherein the at least two functional groups are bound to the polymer binder, and
wherein the Basic Immobilized Amine Sorbent and solid inorganic strength additive are interconnected by the polymer binder.

\* \* \* \* \*